Nov. 8, 1966    R. I. BISHOP ET AL    3,283,573
AIRCRAFT INSTRUMENTS
Filed May 14, 1964    2 Sheets-Sheet 1
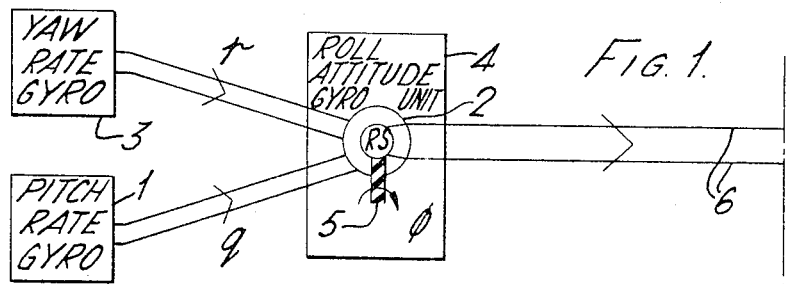
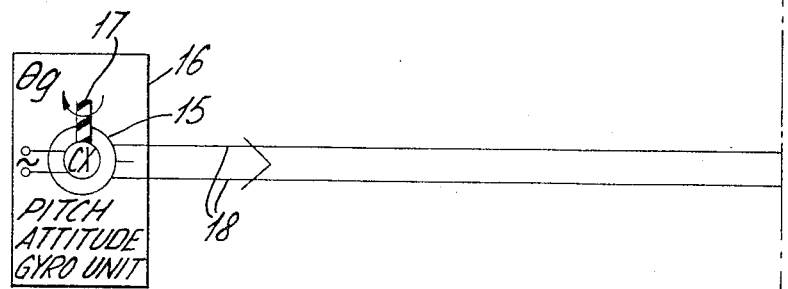
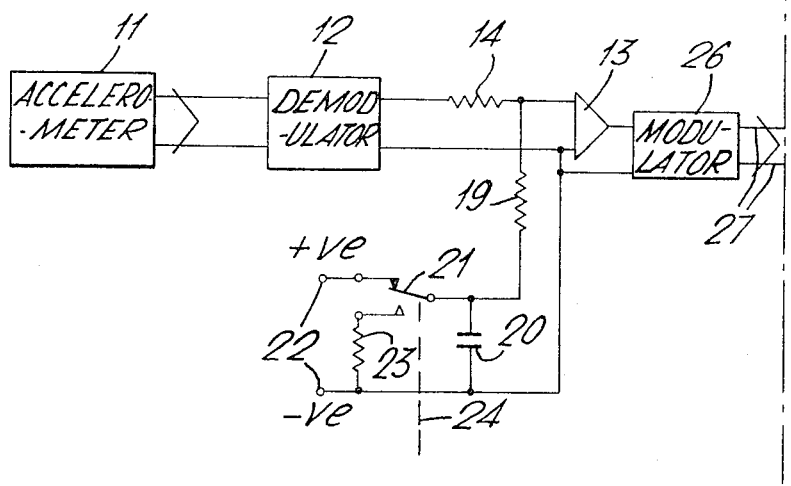
INVENTORS:
ROGER IVAN BISHOP
ERIC RAYMOND KENDALL
RUSSELL ARTHUR PALMER, DECEASED
BY DAPHNE PALMER, EXECUTRIX
ATTORNEYS:
Moore, Hall & Pollock

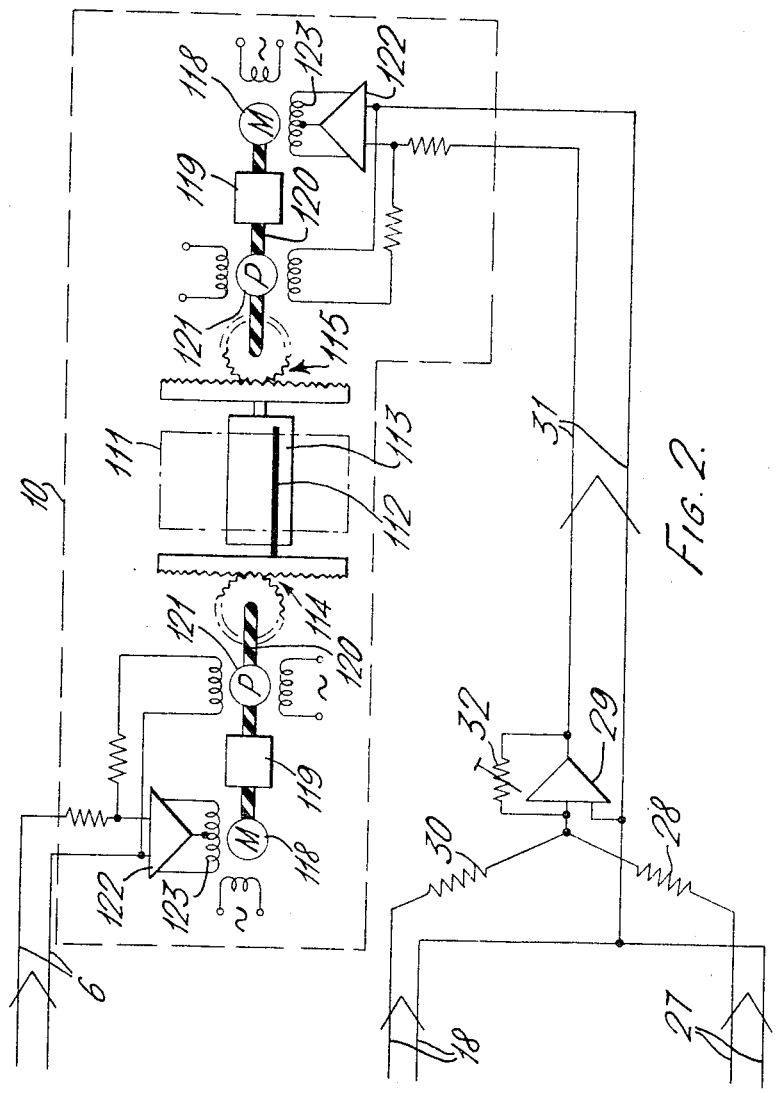

United States Patent Office 3,283,573
Patented Nov. 8, 1966

3,283,573
AIRCRAFT INSTRUMENTS
Roger Ivan Bishop and Eric Raymond Kendall, Cheltenham, England, and Russell Arthur Palmer, deceased, late of Cheltenham, England, by Daphne Palmer, executrix, Felixstowe, Suffolk, England, assignors to S. Smith & Sons (England) Limited, London, England, a British company
Filed May 14, 1964, Ser. No. 367,595
10 Claims. (Cl. 73—178)

The present invention relates to aircraft instruments.

It is becoming increasingly necessary to provide fast modern aircraft with instruments that are designed specifically to deal with certain critical flight manoeuvres and present to the pilot information regarding the action he must take. One such critical manoeuvre is that of take-off when the aircraft has to be handled with precision in order that the flight path shall be well above obstacles on the ground and yet not at any stage so steep that the aircraft fails to gain sufficient speed for safe flight. Economic considerations, particularly with jet aircraft, do not permit the use of liberal safety margins during take-off, and currently the pilot can rely only on his air speed and attitude displays to help him in the exacting task of achieving an acceptable flight path. The task of course becomes even more exacting if power loss or some other emergency condition arises.

A form of aircraft instrument which may be used to assist a pilot in achieving an acceptable flight path, especially during take off, is described in co-pending U.S. patent application Serial No. 326,654, filed November 18, 1963 in the names of R. I. Bishop, E. R. Kendall, and R. A. Palmer, and a development of this is described in the later co-pending U.S. patent application Serial No. 361,404 filed April 21, 1964 in the names of E. R. Kendall and S. B. Newport. The instrument, in broad terms, comprises means for providing a signal dependent upon forward acceleration of the aircraft, means for providing a signal dependent upon rate of change of pitch attitude of the aircraft, and means which is arranged to be responsive to both signals for providing an indication which is dependent upon difference between said rate of change of pitch attitude and a function dependent upon said acceleration such that said indication is indicative of at least the sense of said difference.

In one specific form of aircraft instrument described in the first of the above-mentioned co-pending patent applications, the function dependent upon the forward acceleration is simply the product of said acceleration and a constant, the instrument as a result providing an indication of pitch rate in accordance with the equation:

$$d\theta/dt = K dV/dt \qquad (1)$$

where:

$\theta$ is the pitch attitude of the aircraft,
V is the forward velocity of the aircraft,
K is a constant, and
$t$ is time, $d\theta/dt$ and $dV/dt$ being respectively the rate of change of pitch attitude and the forward acceleration of the aircraft.

It has been found that if Equation 1 is used as a director law during take-off, that is to say if the rate of change of pitch of the aircraft is maintained in constant proportion to the acceleration along the flight path during take-off, a flight path which satisfies broadly safety and operational requirements is achieved. The equation has, in particular, been assessed by calculations covering variations in factors such as the total, all-up weight of the aircraft at take-off and the available propulsive thrust. In respect of calculations relating to one particular multi-engine transport aircraft, for example, consideration has been given to each of the combinations of circumstances that arise when the total weight is 100,000 lbs. or 160,000 lbs. and when all engines or all engines except one are operative. With each case the equation gives a satisfactory flight path with a satisfactory forward speed, a satisfactory margin to stall, and a satisfactory acceleration increment normal to the flight path, when a value of 0.003 or 0.004 is used for the constant K, the rate $d\theta/dt$ being in these circumstances expressed in radians per second and the acceleration $dV/dt$ in feet per second per second. Better speeds and speed margains are obtained, at the expense of lower flight paths, with the value 0.003 rather than 0.004 for the constant K. A lower value than 0.003 for the constant K gives an unduly low flight path under the conditions in which one engine is inoperative, and the total weight is 160,000 lbs., whilst under these conditions a higher value than 0.004 does not allow enough speed margin. The acceptable range for the constant K in the case of this one particular aircraft is thus established, and can equally well be established for other aircraft.

According to the present invention an aircraft instrument comprises first means for providing a signal dependent upon forward acceleration of the aircraft, second means for providing a signal dependent upon rate of change of pitch attitude of the aircraft, and third means which is arranged to be responsive to both signals for providing an indication dependent upon difference between said rate of change of pitch attitude and a function dependent upon said acceleration, said third means including two movable indices that are arranged to be positioned in accordance with the two signals respectively such that the relative position of the two indices provides said indication.

The two indices may be movable along parallel paths one in front of the other, and may be arranged to be positioned along said paths in accordance with the two signals respectively such that the front index lies directly in front of the rear index when said difference is substantially zero. In this case the rear index may have a width, measured in the direction of its path of movement, which is substantially larger than the corresponding width of the front index. Furthermore, the front index may be arranged to be positioned in accordance with the signal dependent upon rate of change of pitch attitude, and the rear index in accordance with the signal dependent upon acceleration.

The function dependent upon acceleration may be simply the product of said acceleration and a constant. Alternatively said function may include one or more further terms dependent upon, for example, the difference between actual and predetermined values of a variable such as forward velocity or pitch angle of the aircraft.

An aircraft instrument in accordance with the present invention will now be described, by way of example, with reference to the accompany drawings in which FIGURES 1 and 2 together show the circuit arrangement of the instrument in block schematic form. FIGURE 2 should be placed on the right-hand side of FIGURE 1 in order to obtain an assembled representation of the instrument.

Referring to the drawings, a pitch rate gyro 1 derives an electric alternating current signal representative of the angular velocity $q$ of the aircraft about its pitch axis, and this signal is supplied to one of two stator windings of a synchro resolver 2. An electric alternating current signal which is representative of the angular velocity $r$ of the aircraft about its yaw axis, and which is derived by a yaw rate gyro 3, is supplied to the other stator winding of the resolver 2. The resolver 2 forms part of a roll-attitude gyro unit 4, and has its rotor coupled to a shaft 5 which is rotated in accordance with the angle $\phi$ of the aircraft about its roll axis, as this is measured by a roll attitude gyro (not shown) in the unit 4. The signal which is as a result induced in the rotor winding of the resolver 2 is representative of ($q \cos \phi - r \sin \phi$) and this is taken as providing a measure of the rate of change of pitch, $d\theta/dt$, of the aircraft measured with respect to gravity axes.

The signal representative of $d\theta/dt$ is applied via a pair of leads 6 to an indicator 10 which also receives another alternating current signal dependent, among other things, upon the forward acceleration $dV/dt$ of the aircraft. This latter signal is derived basically from an accelerometer 11. The accelerometer 11, which may be in the form of a pendulum mounted for angular displacement about an axis parallel to the pitch axis of the aircraft, derives an electric alternating current signal representative of ($dV/dt + g \sin \theta$), where $g \sin \theta$ is an unwanted gravitational component which is inherently measured by the accelerometer 11. The alternating current signal from the accelerometer 11 is supplied to a demodulator 12 so as to derive a corresponding direct current signal, and this latter signal is applied to a direct current amplifier 13 via a resistor 14.

In order to be able to derive from the signal supplied by the accelerometer 11 a signal representative of the acceleration component $dV/dt$ and substantially independent of the gravitational component $g \sin \theta$, use is made of a signal supplied by a synchro control transmitter 15 of a pitch-attitude gyro unit 16. The rotor winding of the synchro control transmitter 15 is excited by alternating current of constant amplitude, and is rotated with respect to the three-phase stator windings of the transmitter 15 in accordance with an angle $\theta_g$ which is the measure of the pitch attitude of the aircraft as this is provided by a pitch attitude gyro (not shown) in the unit 16. The angle $\theta_g$ exceeds the true pitch angle $\theta$ by an error angle $\theta_e$ which arises because of the acceleration $dV/dt$ of the aircraft and the resultant short-term erection errors in the pitch attitude gyro. The error angle $\theta_e$ is normally of small value, and reaches its maximum value of, for example, three degrees, at or just after lift-off. After lift-off it decreases slowly to zero.

A signal which appears across two phases of the stator windings of the synchro control transmitter 15 is representative of ($-\sin \theta_g$). It is this signal as supplied to a pair of leads 18, which is used in removing the unwanted gravity component $g \sin \theta$ from the signal supplied by the accelerometer 11, and in this respect this signal is taken as being, to a satisfactory degree of approximation, representative of $-(\sin \theta + \theta_e)$. Compensation for the component $\theta_e$ introduced by this signal is made using a direct current signal which is synthesised to be representative of the error angle $\theta_e$, and which is supplied to the amplifier 13 via a resistor 19, to be there added as a component $g\theta_e$ to the signal derived from the accelerometer 11.

The signal supplied via the the resistor 19 to the amplifier 13 is synthesised by means of a circuit including a capacitor 20 which is arranged to be charged and discharged via a set of changeover contacts 21. In a first position (as shown) of the contacts 21 the capacitor 20 is connected directly across terminals 22 of a direct curent supply, whereas in the second position the capacitor 20 is discharged through a resistor 23. The contacts 21 are controlled (as represented by a mechanical connection 24) to remain in their first position until the aircraft attains a forward velocity approaching that selected for the rotation phase of take-off, and then to be switched over to their second position. In this manner, the signal appearing across the capacitor 20 and applied via the resistor 19 to the amplifier 13, has a magnitude which is constant until the rotation phase of take-off is reached and then decays to zero.

The direct current output signal of the amplifier 13, being representative of ($dV/dt + g \sin \theta + g\theta_e$), is supplied to a modulator 26 so as to derive a corresponding alternating current signal. This alternating current signal is supplied via a pair of leads 27 and a resistor 28 to an amplifier 29. The amplifier 29 also receives a signal representative of $-g(\sin \theta + \theta_e)$, this signal being derived via a resistor 30 from the signal supplied via the leads 18 by the synchro control transmitter 15. Thus the combined effect of the two signals supplied respectively via the resistors 28 and 30 is to provide an input to the amplifier 29 representative of the forward acceleration $dV/dt$. The output signal of the amplifier 29 is representative of $KdV/dt$ and is applied to the indicator 10 via a pair of leads 31, the value of the constant K being dependent upon the setting of a pre-set resistor 32 connected between the output and input of the amplifier 29.

The indicator 10 has a rectangular viewing aperture 111 (shown in broken outline only) through which two indices, a pointer 112 and a plate 113, are both visible. The indicator 10 is adapted to be mounted in the aircraft with the viewing aperture 111 extending vertically and in a position such that the pilot may readily view the pointer 112 and plate 113 during take-off.

The pointer 112 is mounted in the indicator 10 to extend in the direction across the aperture 111 and to be moved lengthwise of the aperture 111 by means of a servo-controlled rack-and-pinion arrangement 114. The plate 113, which is positioned slightly rearwardly of the pointer 112 so that the pointer 112 may pass across the front of the plate 113, is similarly mounted to extend across the aperture 111 and to be moved lengthwise of the aperture 111 by means of a servo-controlled rack-and-pinion arrangement 115. The pointer 112 and the plate 113 are of optically distinct colours in order that the position of the pointer 112 with respect to the band of colour provided by the plate 113 may be readily observed by the pilot.

The rack-and-pinion arrangements 114 and 115 are controlled by identical servo systems in accordance respectively with the signal on the leads 6 and the signal on the leads 31. Each of the servo systems includes a servo motor 118 that drives the relevant rack-and-pinion arrangement 114 or 115 via gearing 119 and a shaft 120. A pick-off device 121 in each servo system is responsive to the angular position of the shaft 120 and supplies a singal representative of this position to be combined, as degenerative feedback, with the signal on the relevant pair of leads 6 or 31 at the input of a servo amplifier 122. The servo amplifier 122 in each case controls excitation of the control phase 123 of the motor 118, so that the pointer 112 is thereby positioned along the length of the aperture 111 in accordance with the value of pitch rate $d\theta/dt$ represented by the signal on leads 6, and the plate 113 is positioned along the length of the aperture 111 in accordance with the value of $KdV/dt$ as this is represented by the signal on leads 31.

When the indicating instrument is used during take-off, the pilot controls the pitch attitude of the aircraft in such a manner that, at least throughout the phase of take-off when the aircraft flight path is to flare up from the ground, the pointer 112 is maintained over the plate 113. In other words, the pilot maintains the pointer 112, "within" the colour band provided by the plate 113. When the pointer 112 is maintained centrally within the colour band in this way, the rate of change of pitch of the aircraft, is in accordance with the director law of Equation 1. The larger width of the plate 113 compared with the pointer 112 enables slight, permissible variation from the exact law.

In a simplified form of the instrument of FIGURES 1 and 2 the signal derived by the accelerometer 11 and representative of ($dV/dt + g \sin \theta$), is supplied directly to the leads 31, the pitch attitude gyro unit 16 not being used in this case. With this simplified instrument the director law is:

$$d\theta/dt = K(dV/dt + g \sin \theta) \quad (2)$$

and in this case the pilot controls the aircraft in pitch during the flare-up phase until a predetermined desired pitch attitude is attained as indicated by the normal pitch attitude instrument of the aircraft. It is necessary in this case to have an indication of aircraft attitude in order to be able to detect when the correct climb-out attitude is attained. Unlike the director law of Equation 1 involving the term $KdV/dt$ alone, the director law of Equation 2 does not give zero pitch rate demand when a suitable attitude for climb-out has been attained, owing to the presence of the gravitational component ($g \sin \theta$).

As a further simplification, and applicable where a substantially wings-level attitude is maintained throughout take-off, the signal supplied to the leads 6 may be derived solely from the pitch rate gyro 1.

It will be appreciated that the director law used may include in addition to the term dependent upon forward acceleration one or more further terms such as for example described in the second co-pending patent application referred to above. In this latter patent application there is described for example a system based on a director law for which the pitch rate $d\theta/dt$ is equal to a function which includes in addition to a term dependent upon forward acceleration $dV/dt$, a term dependent upon the difference between actual and predetermined values of forward velocity of the aircraft. The predetermined value of forward velocity is the value desired for the climb-out phase of take-off (where forward acceleration is substantially zero), and the added term provides a component of pitch rate demand which is of a sense to demand increase in pitch rate when the forward velocity exceeds the predetermined value and which is larger the larger the difference between the actual and predetermined values. The added term thereby has a supplementary effect directing change in pitch until the desired forward velocity for climb-out is attained. In addition, or as an alternative to the term dependent upon forward velocity, the director law may similarly include a term dependent upon difference between actual and predetermined values of pitch angle of the aircraft, the predetermined value being the value desired for lift off and the term in this case being included only until this desired value is attained at lift-off.

Where as suggested in the preceding paragraph a more complicated director law than Equation 1 is used, the pointer 112 may still be controlled solely in accordance with actual pitch rate $d\theta/dt$, the plate 113 being controlled in accordance with the term dependent upon forward acceleration $dV/dt$ and the one or more additional terms.

We claim:

1. An aircraft instrument comprising first means for providing a signal dependent upon forward acceleration of the aircraft, second means for providing a signal dependent upon rate of change of pitch attitude of the aircraft, and third means responsive to both signals to provide an indication dependent upon difference between said rate of change of pitch attitude and a function dependent upon said acceleration, said third means including two movable indices and means for positioning the two indices in accordance with the two signals respectively such that the relative position of the two indices provides said indication.

2. An aircraft instrument according to claim 1 wherein the two indices are mounted for movement along parallel paths one in front of the other, and are arranged to be positioned along said paths in accordance with the two signals respectively, such that the front index lies directly in front of the rear index when said difference is substantially zero.

3. An aircraft instrument according to claim 2 wherein the rear index has a width, meausured in the direction of its path of movement, which is substantially larger than the corresponding width of the front index.

4. An aircraft instrument according to claim 2 wherein the front index is arranged to be positioned in accordance with the signal dependent upon rate of change of pitch attitude, and the rear index is arranged to be positioned in accordance with the signal dependent upon accleration.

5. An aircraft instrument according to claim 1 wherein said function is simply the product of said acceleration and a constant.

6. An aircraft instrument according to claim 5 wherein the value of the constant is variable selectively.

7. An aircraft instrument according to claim 1 wherein said first means for providing a signal dependent upon forward acceleration of the aircraft includes an accelerometer.

8. An aircraft instrument according to claim 1 wherein said first means comprises an accelerometer for supplying a signal which has a first component dependent upon said accleration and, inherently, a second component dependent both upon gravity and the pitch attitude of the aircraft, a pitch attitude unit for supplying a signal dependent upon the pitch attitude, and means responsive to the signals supplied by the accelerometer and the pitch attitude unit to supply a signal which is dependent upon said first component but substanially independent of said second component of the accelerometer signal.

9. An aircraft instrument according to claim 1 wherein said second means for providing a signal dependent upon rate of change of pitch attitude at least includes a pitch rate gyro.

10. An aircraft instrument according to claim 1 wherein the means for positioning the two indices in accordance with the two signals respectively are servo-controlled rack-and-pinion mechanisms.

References Cited by the Examiner

UNITED STATES PATENTS 3,200,642   8/1965   Neuendorf et al. _____ 73—178

LOUIS R. PRINCE, *Primary Examiner.*